United States Patent [19]

Landers

[11] Patent Number: 5,413,184

[45] Date of Patent: May 9, 1995

[54] METHOD OF AND APPARATUS FOR HORIZONTAL WELL DRILLING

[76] Inventor: Carl Landers, 141 S. Union St., Madisonville, Ky. 42431

[21] Appl. No.: 131,526

[22] Filed: Oct. 1, 1993

[51] Int. Cl.⁶ .............................................. E21B 7/08
[52] U.S. Cl. ..................................... 175/62; 175/424; 299/17
[58] Field of Search ................... 175/62, 61, 424; 299/16, 17

[56] References Cited

U.S. PATENT DOCUMENTS

| Re. 33,660 | 8/1991 | Jelsma | 175/107 |
|---|---|---|---|
| 1,367,042 | 2/1921 | Granville . | |
| 1,485,615 | 3/1924 | Jones . | |
| 1,733,311 | 10/1929 | McNeill . | |
| 2,065,436 | 12/1936 | Ervin . | |
| 2,251,916 | 8/1941 | Cross . | |
| 2,271,005 | 1/1942 | Grebe . | |
| 2,345,816 | 4/1944 | Hays . | |
| 3,191,697 | 6/1965 | Haines | 175/424 X |
| 3,262,508 | 7/1966 | Price | 175/424 X |
| 3,670,831 | 6/1972 | Winter, Jr. et al. . | |
| 3,838,736 | 10/1974 | Driver . | |
| 3,840,079 | 10/1974 | Williamson . | |
| 3,853,185 | 12/1974 | Dahl et al. . | |
| 3,873,156 | 3/1975 | Jacoby | 299/4 |
| 3,958,649 | 5/1976 | Bull et al. | 175/61 |
| 4,168,752 | 9/1979 | Sabol | 175/12 |
| 4,365,676 | 12/1982 | Boyadjieff et al. | 175/61 |
| 4,368,786 | 1/1983 | Cousins | 175/78 |
| 4,445,574 | 5/1984 | Vann | 175/268 |
| 4,526,242 | 7/1985 | Mathieii et al. | 175/94 |
| 4,527,639 | 7/1985 | Dickinson, III et al. | 175/61 |
| 4,533,182 | 8/1985 | Richards | 299/2 |
| 4,589,499 | 5/1986 | Behrens | 173/22 |
| 4,601,353 | 7/1986 | Schuh et al. | 175/41 |
| 4,640,362 | 2/1987 | Schellstede | 166/298 |
| 4,763,734 | 8/1988 | Dickinson et al. | 175/61 |
| 4,832,143 | 5/1989 | Kaalstad et al. | 175/365 |
| 4,832,552 | 5/1989 | Skelly | 414/22.54 |
| 4,836,611 | 6/1989 | El-Sale | 299/7 |
| 4,848,486 | 7/1989 | Bodine | 175/55 |
| 4,854,400 | 8/1989 | Simpson | 175/85 |
| 4,890,681 | 1/1990 | Skelly | 173/163 |
| 5,090,496 | 2/1992 | Walker | 175/61 |
| 5,113,953 | 5/1992 | Noble | 175/61 |
| 5,148,880 | 9/1992 | Lee et al. | 175/393 |
| 5,165,491 | 11/1992 | Wilson | 175/62 |
| 5,183,111 | 2/1993 | Schellstade | 175/62 X |

*Primary Examiner*—Terry Lee Melius
*Attorney, Agent, or Firm*—Middleton & Reutlinger; Charles G. Lamb

[57] ABSTRACT

A method and apparatus for penetrating a well casing and surrounding earth strata includes the insertion of a flexible shaft having a ball cutter on an end thereof into upset tubing within a well casing. The upset tubing is provided with an elbow at its lower extremity for receiving the ball cutter therein. The flexible shaft is then rotated and the ball cutter cuts a hole in the well casing and is then moved horizontally a distance, usually less than 30". The flexible shaft and ball cutter are then removed and a flexible tube having a nozzle blaster on an end thereof is then inserted into the upset tubing in the channel. A fluid of surfactant and water at high pressure is then pumped into the tube wherein the high pressure fluid passes through orifice in the spiral drill thereby cutting an extension into the previously cut channel. The tube is continually feed into the channel as the high pressure fluid continues to blast away the earth's strata. The channel is then cut a preselected distance from the well up to 200 feet and beyond.

9 Claims, 3 Drawing Sheets

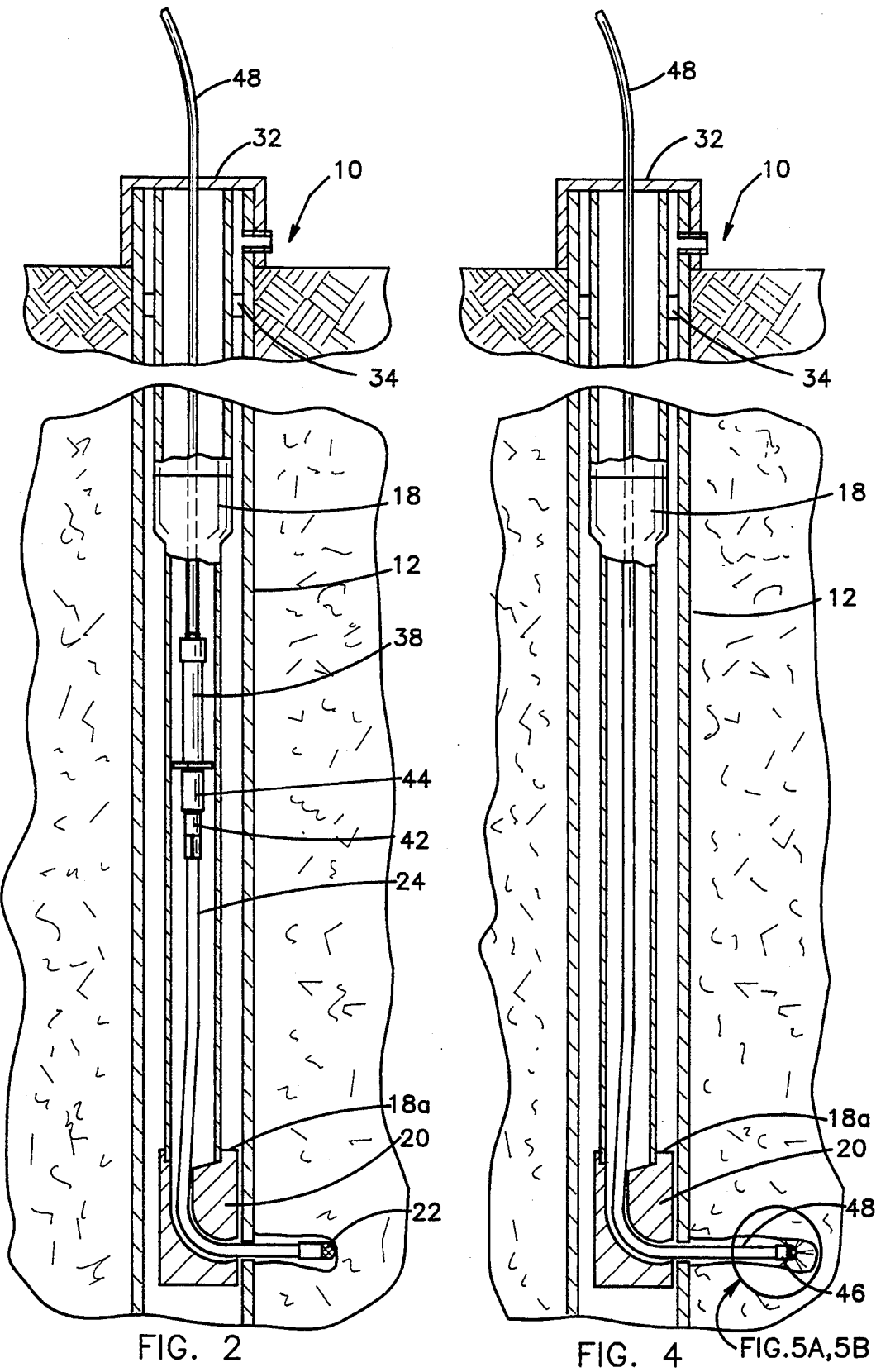

METHOD OF AND APPARATUS FOR HORIZONTAL WELL DRILLING

BACKGROUND OF THE INVENTION

FIELD OF THE INVENTION

The present invention relates to a method and apparatus for horizontal drilling into the earth strata surrounding a well casing. More specifically, the present invention relates to a method and apparatus for drilling through the walls of a vertically extending well casing at a 90° angle to provide horizontal drilling into the earth's strata for a substantial distance radially from the vertically extending well casing.

Oil and gas wells are drilled by the use of rotary drilling equipment vertically into the earth's strata. The vertically extending well holes generally include a casing usually of mild steel in the neighborhood of 4 $\frac{1}{2}$" to 8" in diameter which define the cross-sectional area of a well for transportation of the oil and gas upwardly to the earth's surface. However, these vertically extending wells are only useful for removing oil and gas from the general vicinity adjacent to and directly underneath the terminating downward end of the well. Thus, not all of the oil and gas in the pockets or formations in the earth's strata, at the location of the well depth, can be removed. Therefore, it is necessary to either make other vertical drillings parallel and close to the first drill, which is timely and costly, or provide means to extend the original well in a radial or horizontal direction. The most common means for horizontal extension of the well has been to drill angularly through the well casing at a first 45° angle for a short distance and then to turn the drill and drill at a second 45° angle thereby making a full 90° angular or horizontal cut from the vertically extending well. These horizontal drills have proved useful for extending the well horizontally. However, most of these horizontally extending cuts have proved to be relatively expensive.

There have been a number of patents issued which teach a number of different ideas for accomplishing horizontal drillings or cuttings into the earth's strata surrounding an existing well, but, again, most of these have proved to be costly and have also not produced the desired results. U.S. Pat. No. 4,460,362 teaches a method of penetrating a well casing and surrounding earth strata with the use of a punch member for cutting through a well casing wherein the punch member includes a retractable jet nozzle means therein for penetrating the surrounding earth's strata after the punch member has cut through the casing. Other patents which teach drilling components for horizontal extensions from vertically extending wells wherein hydraulic fluid directing nozzles are used in the drilling operations include U.S. Pat. Nos. 2,271,005; 2,345,816; 3,838,736; 3,873,156; and, 4,168,752.

SUMMARY OF THE INVENTION

The present invention is directed to a method and apparatus for penetrating a well casing and surrounding earth strata. Furthermore, the present invention is directed to a method of penetrating a well casing and surrounding earth strata utilizing a two-step process wherein a flexible shaft having a ball cutter on one end thereof is used to make a cut through the well casing and a pre-cut into the earth's strata surrounding the well casing and the second step involves the use of a flexible tube having a nozzle blaster on the end thereof which is then inserted down the well casing into the pre-cut and in combination with a high pressure fluid pumped through the flexible tube and out through the nozzle blaster, a horizontal extension of the pre-cut can then be made up to a distance of more than 200 feet. The upset tubing can then be turned from the surface 90° to repeat the process in another direction. One can then cut another hole through the casing 12 and repeat the process up to 4 directions on one level. Many levels can be opened with the same procedure.

More particularly, the present invention is directed to a method of penetrating a well casing and surrounding earth strata comprising: the steps of inserting a flexible shaft having a cutting means on one end thereof into upset tubing in a well casing wherein the upset tubing is provided with an elbow at its terminating end; rotating said flexible shaft and said cutting means thereby cutting a hole in said well casing and the earth's strata surrounding the well casing; removing the flexible shaft and the cutting means from the upset tubing; inserting a flexible tube having a nozzle blaster on an end thereof into the upset tubing and out through the cut in the well casing and the earth's strata; and, pumping fluid at high pressure into the tubing and nozzle blaster thereby cutting an extension of the cut into the earth's strata.

BRIEF DESCRIPTION OF THE DRAWINGS

FIG. 2 is an enlarged sectional view of FIG. 1A but with emphasis on the lower portion of the well where a cut into the hole casing is to be made;

FIG. 4 is an enlarged elevational view of FIG. 1B with emphasis being placed on the lower end of the well to emphasize the apparatus utilized in drilling an extension into the earth's strata away from the well;

DESCRIPTION OF THE PREFERRED EMBODIMENT

Figure 1A:
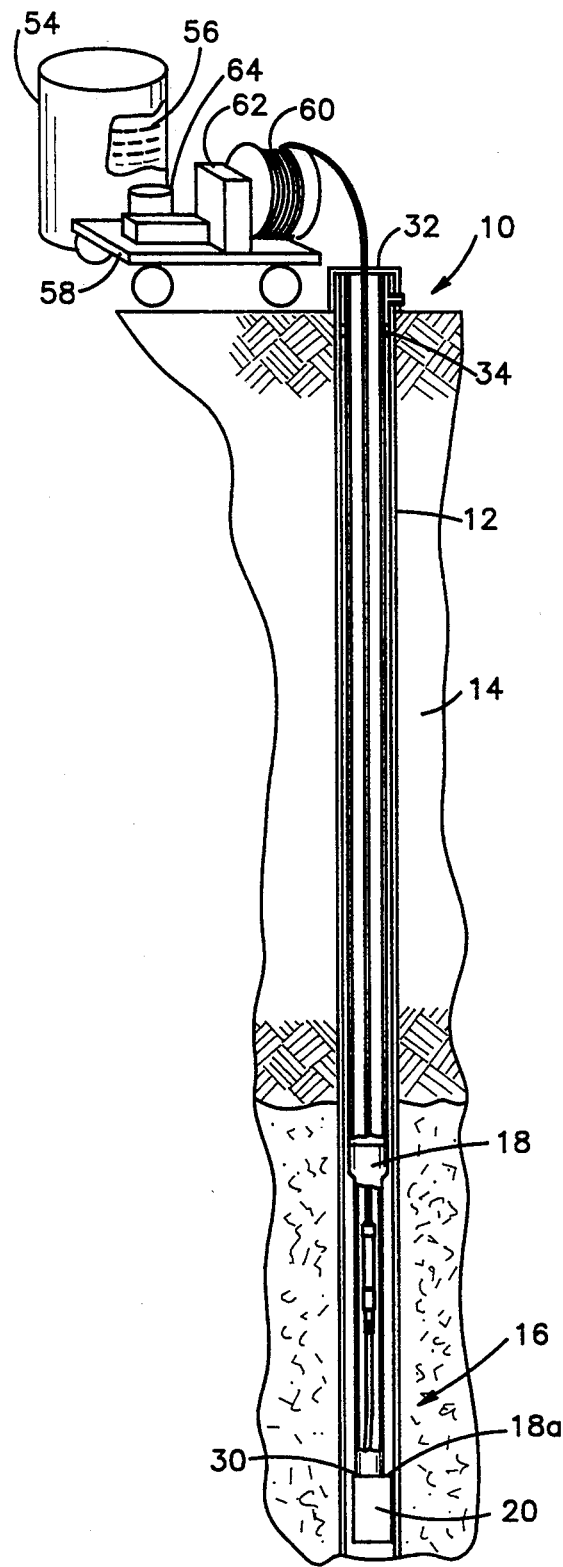
FIG. 1A is a side elevational view showing a gas or oil well in section and the down hole apparatus of the present invention being used in cutting an opening in the well casing.

FIG. 1A and FIG. 2 of the drawing shows the employment of a preferred embodiment of the invention in an oil well 10 having a well casing 12 which extends downwardly through the earth's strata 14 into a pocket of oil or gas. FIG. 1A shows the apparatus 16 used in making a cut through the well casing 12.

The apparatus 16 includes upset tubing 18 which extends downwardly through the well casing 12 a preselected distance, the preselected distance being the distance to which a cut into the well casing 12 is to be made and the positioning of the terminating end 18a for the horizontal cut into the earth's strata. The upset tubing 18 may be any upset tubing well known in the art, but at the terminating end 18a of the upset tubing 18 is an elbow 20 which is positioned to be rotated to a specific position within the well casing 12 for making the cut therethrough as well as to receive a ball cutter 22 and flexible shaft 24 therethrough. The elbow 20 is generally made from a octagonally-shaped block of metal which with an opening extending therethrough, the inlet 20a and outlet 20b being 90° to each other. Inlet 20a has a larger diameter than the outlet 20b. The upset tubing 18 has an O.D. less than the I.D. of the well casing 12 and is usually made of rolled steel. In a preferred embodiment, the upset tubing is metallic and the terminating end 18a is attached to the elbow 20 by welding at the location noted by the numeral 30. The upset tubing 18 is generally mounted onto the head of the well 32. Located at a down hole position just inside the well is a blow out preventer 34 which is generally well known in the oil and gas drilling art wherein blow out preventers are used to prevent the blow back of materials up through the upset tubing at the well head 32.

The ball cutter 22 is coupled to the flexible shaft 24 on one end and shaft 24 on its opposite end is coupled to a fluid driven motor 38 which is suspended down into the upset tubing 18. Fluid returns through exhaust vent on the motor 38 and then flows between flex tubing 48 and the tubing 18, and carries the fluid for the operation of the fluid driven motor 38. The fluid driven motor 38 is, for example, an Ingersol-Rand Model No. DLO 21B-5-P which is operable in response to 1000 pounds of hydraulic pressure as delivered through the fluid tube 48. Fluid driven motor 38 generally turns at 500 rpm.

However, in the present operation a reducer 42 is attached to the outlet shaft 44 of the motor 38 wherein the reducer 42 reduces the 500 rpm rotating speed down to generally between 40 to 60 rpm. The ball cutter 22 is a tungsten carbide cutter with a roughened surface and in cutting through of the well casing 12 is designed to rotate at a relatively low speed, such as the 40 to 60 rpm noted previously. Operation of the ball cutter 22 of the present invention at a high rate of speed generally makes the cutting through the well casing 12 difficult to control and it has been found that with a rotatable speed of 40 to 60 rpm, the ball cutter can still make a cut in a relatively short period of time, such as in about 15 minutes through a well casing 12 which is 1/8" thick.

Figure 1B:
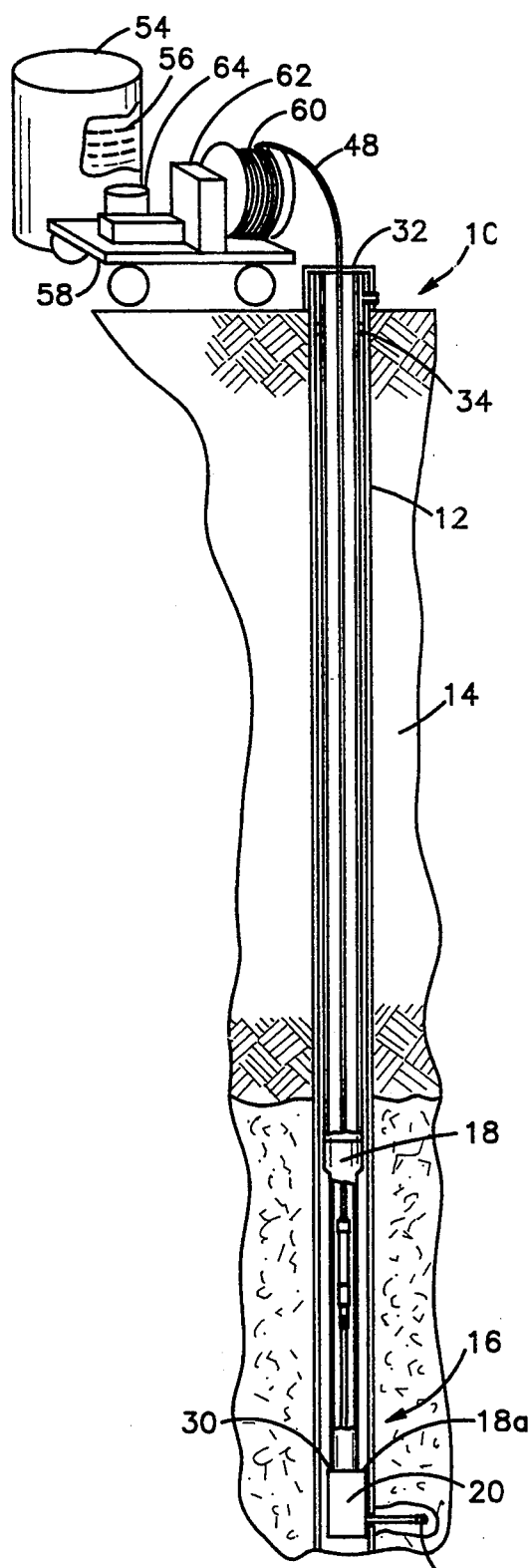
FIG. 1B is a side elevational view showing a gas or oil well in section and the down hole apparatus of the present invention being used in extending horizontally the cut in the earth's strata shown in FIG. 1A.
Figure 3:
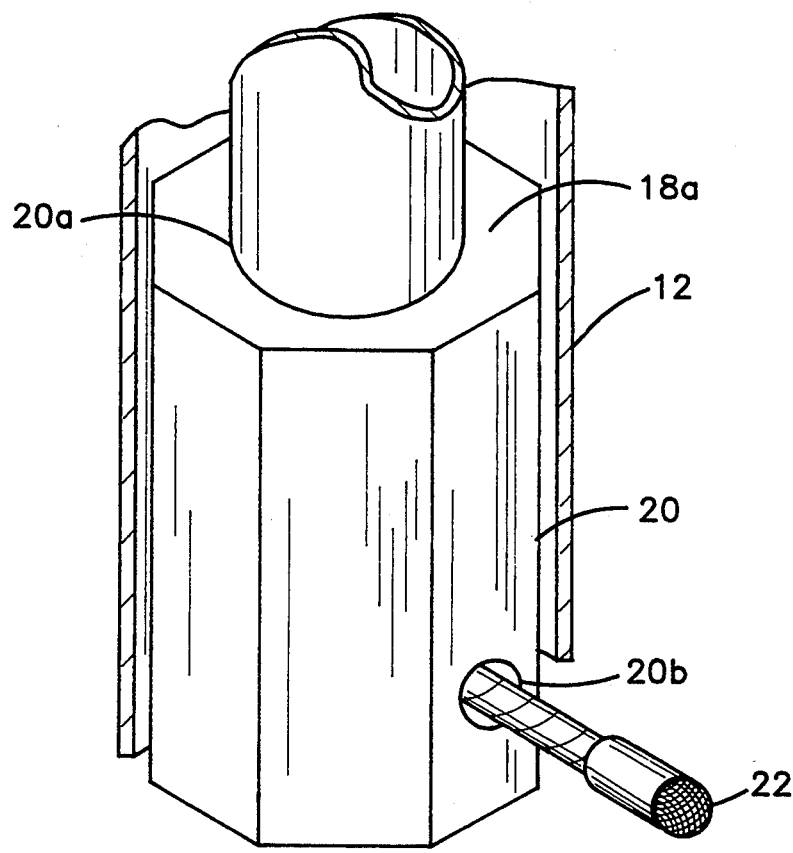
FIG. 3 is an enlarged perspective view of the cutting ends of the apparatus of FIG. 2.
Figure 5A:
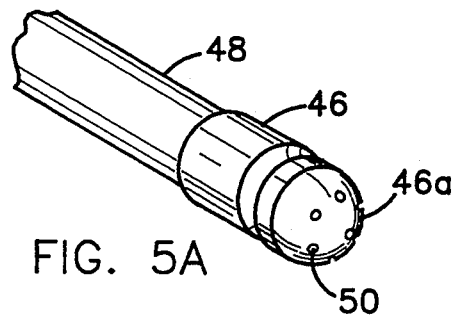
FIG. 5A is an enlarged perspective view of the cutting end of the apparatus of FIG. 4; and, FIG. 5B is a perspective view of FIG. 5A with selected portions cut-away, and rotated 90°.
Figure 5B:
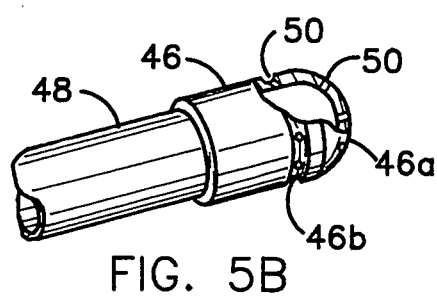

In FIG. 1B a preferred embodiment of the present invention is shown wherein a cut in the well casing 12 is utilized as the starting point for drilling a hole into the earth's strata 14 outwardly from the well casing 12. A nozzle blaster 46 is suspended to the oil well 10 wherein the nozzle blaster 46 is threadably attached to the end of a fluid tube 48. Fluid tube 48 may be of an elastomeric or metallic material, but must be capable of withstanding internal fluid pressures of up to and greater than 4000 psi. One preferred tube is a flexible, seamless, stainless steel tubing approximately 0.25 inches I.D. and approximately 0.375 inches O.D. As best shown in FIGS. 4, 5A, and 5B, the nozzle blaster 46 is provided with a plurality of apertures or nozzles 50 therein, the apertures 50 being dispersed uniformly over the conical portion 46a of the nozzle blaster. The apertures are positioned to provide openings from the inside of the nozzle blaster 46 so that fluid passing from the inside of the nozzle 46 is directed outwardly away from the well casing 12 at a 45° angle from the longitudinal axis passing therethrough. In the base portion 46b of the conically shaped nozzle blaster 46, the apertures 50 are also disposed at a 45° angle to longitudinal axis to provide high pressure fluid inwardly towards the well casing 12 thereby keeping the channel or cut open as the nozzle 46 moves outwardly away from the well casing. In a preferred nozzle blaster 46, apertures 50 are approximately 0.026" in diameter.

As best shown in Fig 1B, the fluid tube 48 at its inlet end is in flow communication with a tank container 54 which includes fluid 56 therein. The container 54 is separate and free standing and tube 48 is coiled onto a rotatable drum 60 also mounted on the platform skid 58. The fluid tube 48 is rolled upon or unrolled from drum 60 for use within the oil well 10.

The fluid 56 in the container 54 is generally a mixture of a surfactant and water wherein the surfactant is generally from about 1 to 5% by weight of the total solution. In the drilling operation, the fluid 56 is generally heated in a heat exchanger 62 also mounted on the platform skid 58 which maintains the surfactant water solution in a heated condition. Generally, the temperature of the surfactant water solution is between about 130° F. and 160° F. And, the surfactant is generally selected from a group consisting of water wetters, oil wetters, and surfactants with a sodium salt. One preferred surfactant is a product manufactured by Climax Performance Materials Corporation under the trademark ACTRASOL-MY-75 which is a mixture of sulfonated soybean oil, a sodium salt, and a methyl ester of soybean oil.

Also provided on the platform skid 58 is a pump 64 which is, for example, Giant Industries, Model Number P450A which will produce a fluid discharge pressure of up to 5000 psi. Pump 64 mounted onto the platform skid 58 is in fluid communication with the fluid tube 48 for pumping the surfactant water solution 56 from the container 54 into the oil well 10 wherein the high pressure fluid 56 discharges through the openings in the nozzle blaster 46 at 3500 to 4000 psi. And, with continual feeding of the tube 48 down through the upset tubing 18, a horizontal drill or cut into the earth's strata 14 in excess of 200 feet away from the well casing 12 is possible. Moreover, the time for making the drill 200 feet from the well casing can be expected to be accomplished within 6 to 10 hours.

In operation, the upset tubing 18 having the elbow 20 on the end thereof is lowered into a well casing 12 to a preselected position therein, the position being determined as the location for a horizontal drill into the earth's strata 14. A fluid tube 48 having a fluid driven motor 38 on the terminating end thereof with a reducer 42, flexible shaft 24 and ball cutter 22 extending therefrom is lowered into the well casing 12 until the ball cutter 22 passes out through the elbow 20 until the ball cutter 22 is positioned adjacent to the inside of the wall casing 12. Fluid at approximately 1000 psi is pumped down through a fluid tube 48 wherein the fluid, which is generally a surfactant-water mixture 56 activates the fluid driven motor 38 and in turn the reducer 42. Reducer 42 turns the flexible shaft 24 thereby rotating the ball cutter 22 at approximately 40 to 60 rpm. Within about 15 minutes the ball cutter 22 cuts through the well casing 12 which is 1/8" in thickness. After the cut through the casing 12, flexible fluid tube 48 is continually lowered so the ball cutter 22 continues moving outwardly into the earth's strata for a preselected distance, generally about 8" to 12" and preferably about 12". The 12" is generally sufficient for the starting point for the horizontal drilling or extension of the pre-cut into the earth's strata. The ball cutter 22 is then removed from the upset tubing 18 and wound back up onto a drum 66 on the platform skid 58. The fluid tube 48, including the nozzle blaster 46 on the terminating end thereof, is then lowered down into the upset tubing 18 and is continued to be rolled off of the drum 60 until it extends through the elbow 20, through the opening in the wall casing 12 which has been made previously by the ball cutter 22, and to the end of the pre-cut into the earth's strata 14 by ball cutter 22. When the nozzle blaster has reached the pre-cut distance from the well casing 12, pump 64 is turned on and the surfactant-water mixture 56 is then pumped at a pressure of 3500 to 4000 psi from the container 54 through the heat exchanger 62 down into the oil well 10 and out through the nozzle blaster 46. The high pressure fluid 56 is continually pumped and the tube 48 is continually unwound from the well 60 until a preselected distance from the well casing 12 is obtained. The high pressure fluid spewing from the nozzle blaster 46 is capable of cutting through the earth's strata including limestone layers and other softer materials without delay and within 6 to 10 hours can blast or cut horizontally at least 200 feet.

It is realized that while the preferred embodiment of the invention has been disclosed herein, further modifications to the preferred embodiment will occur to those skilled in the art and such obvious modifications are intended to be within the scope and spirit of the present invention.

What is claimed is:

1. A method for penetrating a well casing and surrounding earth strata comprising the steps of:
   (a) inserting an upset tubing having an elbow on an end thereof a preselected distance into a well casing;
   (b) inserting a flexible shaft having cutting means on an end thereof into said upset tubing, said cutting means extending through said elbow;
   (c) rotating said flexible shaft and said cutting means cutting a hole in said well casing;
   (d) cutting a channel a preselected length in the earth's strata surrounding said well casing;
   (e) removing said flexible shaft and said cutting means from said upset tubing;
   (f) inserting a flexible tube having a nozzle on an end thereof into the upset tubing and said channel;
   (g) pumping a fluid into the flexible tube and nozzle; and,
   (h) cutting an extension of said channel in said earth's strata.

2. The method of claim 1, said flexible shaft being rotated in response to a fluid motor.

3. The method of claim 1 wherein said cutting of a preselected length into the earth's strata is from about 8" to 12".

4. The method of claim 1, said nozzle being a nozzle blaster, conical in shape with a fluid chamber therein in fluid communication with said flexible tube, said nozzle blaster having a conical portion and a base portion, said nozzle blaster having a plurality of openings therein extending into said chamber wherein said openings have a diameter of about 0.026" and are positioned at an angle of about 45° to the longitudinal axis passing through said nozzle blaster.

5. The method of claim 1 wherein said fluid is a mixture of a surfactant and water.

6. The method of claim 5 wherein said surfactant is from about 1 to 5% by weight of the surfactant and water mixture.

7. The method of claim 5 wherein said surfactant is selected from the group consisting of water wetters, oil wetters, and surfactants with a sodium salt.

8. The method of claim 5 wherein said surfactant is a mixture of a sulfonated soybean oil, a sodium salt and a methyl ester of soybean oil.

9. The method of claim 1, said cutting of an extension of said channel being up to 200' horizontally from said well casing.

* * * * *